United States Patent
Knobloch et al.

(10) Patent No.: US 9,562,148 B2
(45) Date of Patent: *Feb. 7, 2017

(54) BASIC STABILISATION SYSTEMS FOR EMULSION POLYMERISED RUBBER

(71) Applicant: BASF SE, Ludwigshafen (DE)

(72) Inventors: Gerrit Knobloch, Magden (CH); Pierre Rota-Graziosi, Mulhouse (FR)

(73) Assignee: BASF SE, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/923,986

(22) Filed: Oct. 27, 2015

(65) Prior Publication Data

US 2016/0046789 A1  Feb. 18, 2016

Related U.S. Application Data

(63) Continuation of application No. 12/992,099, filed as application No. PCT/EP2009/055460 on May 6, 2009.

(30) Foreign Application Priority Data

May 15, 2008  (EP) .................... 08156250

(51) Int. Cl.
| | |
|---|---|
| C08K 5/375 | (2006.01) |
| C08K 3/00 | (2006.01) |
| C08K 5/00 | (2006.01) |
| C08K 5/18 | (2006.01) |
| C08L 21/00 | (2006.01) |

(52) U.S. Cl.
CPC .......... *C08K 5/375* (2013.01); *C08K 3/0008* (2013.01); *C08K 5/0008* (2013.01); *C08K 5/18* (2013.01); *C08L 21/00* (2013.01)

(58) Field of Classification Search
CPC ....... C08L 21/00; C08K 5/375; C08K 3/0008; C08K 5/0008; C08K 5/18
USPC ........................................................ 524/258
See application file for complete search history.

(56) References Cited

U.S. PATENT DOCUMENTS

| | | | |
|---|---|---|---|
| 876,283 | A | 1/1908 | Heinz |
| 4,242,224 | A | 12/1980 | Dean et al. |
| 4,250,083 | A | 2/1981 | Click et al. |
| 4,325,863 | A | 4/1982 | Hinsken et al. |
| 4,338,244 | A | 7/1982 | Hinsken et al. |
| 4,829,115 | A | 5/1989 | Cottman |
| 4,857,572 | A | 8/1989 | Meier et al. |
| 5,175,312 | A | 12/1992 | Dubs et al. |
| 5,216,052 | A | 6/1993 | Nesvadba et al. |
| 5,252,643 | A | 10/1993 | Nesvadba |
| 5,356,966 | A | 10/1994 | Nesvadba |
| 5,367,008 | A | 11/1994 | Nesvadba |
| 5,369,159 | A | 11/1994 | Nesvadba |
| 5,427,701 | A | 6/1995 | Meier et al. |
| 5,428,162 | A | 6/1995 | Nesvadba |
| 5,428,177 | A | 6/1995 | Nesvadba |
| 5,516,920 | A | 5/1996 | Nesvadba et al. |
| 5,633,321 | A | 5/1997 | Arjunan |

(Continued)

FOREIGN PATENT DOCUMENTS

| | | |
|---|---|---|
| DE | 4316611 | 11/1993 |
| DE | 4316622 | 11/1993 |

(Continued)

OTHER PUBLICATIONS

Ullmann's Encyclopedia of Industrial Chemistry, vol. A23, pp. 221-440, 1993.
Elastomers, Chapter 12, An introduction to polymer science, 1997, pp. 388-393.
Polymer Latices and their application, Applied Science Publishers Ltd., 1982, pp. 29-31.
International Search Report issued Jun. 30, 2009 in PCT/EP2009/055460 filed May 6, 2009.

*Primary Examiner* — Angela C Scott
(74) *Attorney, Agent, or Firm* — Oblon, McClelland, Maier & Neustadt, L.L.P.

(57) ABSTRACT

There are described compositions comprising a) an emulsion crude rubber, synthetic latex or natural rubber latex subject to oxidative, thermal, dynamic and/or light-induced degradation, b) a compound of the formula (I) wherein $R_1$ is $C_8$-$C_{12}$alkyl, $R_2$ is hydrogen, $C_1$-$C_{12}$alkyl, cyclohexyl, 1-methylcyclohexyl, benzyl, α-methylbenzyl, α,α-dimethylbenzyl or —$CH_2$—S—$R_1$, $R_3$ is $C_1$-$C_{12}$alkyl, benzyl, α-methylbenzyl, α,α-dimethylbenzyl or —$CH_2$—S—$R_1$, $R_4$ is hydrogen or methyl, and c) a styrenated diphenylamine of the formula (II).

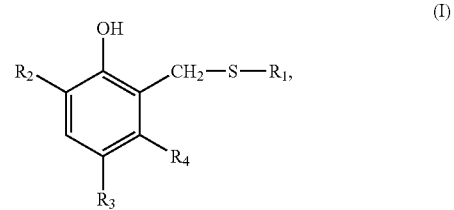

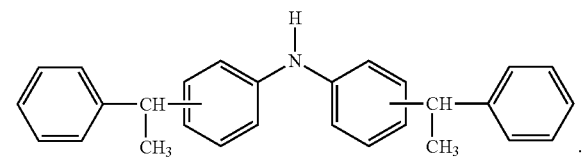

13 Claims, No Drawings

(56) References Cited

U.S. PATENT DOCUMENTS

| | | |
|---|---|---|
| 5,919,876 A | 7/1999 | Castner |
| 6,383,992 B1 | 5/2002 | Garmier et al. |
| 6,596,796 B1 | 7/2003 | Meier et al. |
| 6,881,774 B2 | 4/2005 | Schrinner et al. |
| 9,309,379 B2 * | 4/2016 | Knobloch ................ C08K 5/18 |
| 2008/0023093 A1 | 1/2008 | Mobley |
| 2010/0130660 A1 | 5/2010 | Knobloch et al. |

FOREIGN PATENT DOCUMENTS

| | | |
|---|---|---|
| DE | 4316876 | 11/1993 |
| EP | 0589839 | 3/1994 |
| EP | 0591102 | 4/1994 |
| EP | 1 146 038 | 10/2001 |
| EP | 1291384 | 3/2003 |
| GB | 2 040 294 | 8/1980 |
| GB | 2 355 463 | 4/2001 |
| JP | 2001-253976 | 9/2001 |
| JP | 2005-036165 | 2/2005 |

\* cited by examiner

BASIC STABILISATION SYSTEMS FOR EMULSION POLYMERISED RUBBER

This application is a continuation application of U.S. Ser. No. 12/992,099 filed on Nov. 11, 2010 which is a 371 application of PCT/EP2009/055460 filed on May 6, 2009.

The present invention relates to compositions comprising an emulsion crude rubber, synthetic latex or natural rubber latex subject to oxidative, thermal, dynamic and/or light-induced degradation and, as stabiliser, a mixture selected from a specific group of the alkylthiomethylphenol type compounds and styrenated diphenylamines, and also to the use thereof as colour-stable and non-discolouring stabilisers for stabilising emulsion crude rubbers, synthetic latices or natural rubber latices against oxidative, thermal, dynamic and/or light-induced degradation, and to a method of stabilising emulsion crude rubbers, synthetic latices or natural rubber latices, in which method at least a mixture selected from a specific group of the alkylthiomethylphenol type compounds and styrenated diphenylamines is incorporated therein or applied thereto.

Raw rubbers, like all polymers, are susceptible to oxidative, thermal, dynamic or light-induced degradation. For various grades of raw rubbers, e.g. adhesive grades, corresponding food contact approvals are mandatory. Alkylthiomethylphenol type compounds such as for example Irganox 1520(® Ciba Inc.) fulfill these requirements but can have technical drawbacks in case of for example halogen containing coagulation systems.

U.S. Pat. No. 6,383,992 discloses biodegradable vegetable oil compositions comprising styrenated diphenylamines such as for example Wingstay 29 (® Goodyear) with food contact approval.

It has now been found that a mixture selected from a specific group of the alkylthiomethylphenol type compounds and styrenated diphenylamines are especially suitable as stabilisers for emulsion crude rubbers, synthetic latices or natural rubber latices that are sensitive to oxidative, thermal, dynamic and/or light-induced degradation.

The present invention accordingly relates to compositions comprising
a) an emulsion crude rubber, synthetic latex or natural rubber latex subject to oxidative, thermal, dynamic and/or light-induced degradation, and
b) a compound of the formula I

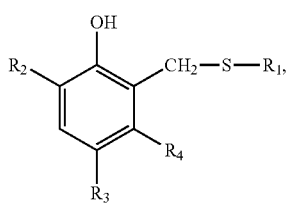

wherein
$R_1$ is $C_8$-$C_{12}$alkyl,
$R_2$ is hydrogen, $C_1$-$C_{12}$alkyl, cyclohexyl, 1-methylcyclohexyl, benzyl, α-methylbenzyl, α,α-dimethylbenzyl or —$CH_2$—S—$R_1$,
$R_3$ is $C_1$-$C_{12}$alkyl, benzyl, α-methylbenzyl, α,α-dimethylbenzyl or —$CH_2$—S—$R_1$,
$R_4$ is hydrogen or methyl, and c) a styrenated diphenylamine of the formula II

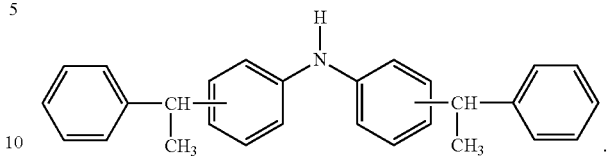

Emulsion rubbers are manufactured by emulsion polymerisation. Emulsion polymerisation in water, which is initiated with redox initiators at low temperatures (cold rubber) or at relatively high temperatures (hot rubber) with organic peroxides or persulfates, as the case may be, yields latices that are used as such or are processed to yield solid rubber. The molar weights of emulsion SBR are in the range of about from 250 000 to 800 000 g/mol; cold and hot rubbers differ in the degree of branching. The rubbers are sold as such or blended with oil or loaded with carbon blacks and constitute the most important synthetic rubbers.

Natural rubber latex and a wide variety of types of synthetic latices are available commercially. Polymer latices are colloidal dispersions of rubber or of a plastic material in an aqueous medium. The polymeric material may be a polymer of small ethylenic (olefinic) monomers or diene monomers or alternatively a copolymer of two or more such monomers. The mechanical stability of such latices depends principally upon the presence of surface-active substances at the interface between polymer particle and aqueous phase.

Most synthetic latices consist of styrene-butadiene, styrene-acrylic acid, acrylic acid esters, vinyl acetate-acrylate or butadiene-acrylonitrile. Carboxylated latices, such as carboxylated SBRs, additionally comprise, for example, up to 5% of the monomer unit containing the carboxyl group or corresponding carboxylic acid esters. Advantageously there are used as organic acid unsaturated mono- and di-carboxylic acids, such as acrylic acid, methacrylic acid and, for example, methylenesuccinic acid (itaconic acid). As carboxylic acid esters, which are used, for example, as comonomers for vinyl acetate, there is principally used fumaric acid diethyl ester, maleic acid diethyl ester, methyl acrylate, n-butyl acrylate or 2-ethylhexyl acrylate.

The organic acid used determines, to a considerable degree, the properties of the carboxylated SBRs obtained at reaction temperatures of from about 60 to about 100° C. There may be mentioned by way of example the water solubility or the final working properties, which are substantially influenced by the number of carboxyl groups on the surface of the latex. A typical mixture of components and the properties thereof are described in Polymer Latices and their Application (Applied Science Publishers Ltd., London 1982; Editor K. O. Calvert), pages 29 to 31. The main use of such X-SBRs is in the paper industry, the adhesives industry and also in the textile industry and, in the latter case, specifically in the field of carpeting. In the paper industry, carboxylated latices are used, for example, for surface-coatings for paper; in the adhesives industry they are used, for example, for dispersion adhesives and in the dyestuffs industry they are used, for example, for disperse dyes.

The articles produced from the latex have to be stabilised against the action of heat and oxygen by means of antioxidants.

Of interest are compositions wherein $R_1$ is $C_8$alkyl or $C_{12}$alkyl.

Of special interest are compositions wherein
$R_2$ is $C_1$-$C_8$alkyl, benzyl or α-methylbenzyl,
$R_3$ is $C_1$-$C_9$alkyl or —$CH_2$—S—$R_1$, and
$R_4$ is hydrogen or methyl.

Of particular interest are compositions wherein
$R_2$ is $C_1$-$C_4$alkyl or benzyl,
$R_3$ is $C_1$-$C_4$alkyl or —$CH_2$—S—$R^2$, and
$R_4$ is hydrogen or methyl.

Preference is given to compositions wherein
$R_1$ is $C_8$alkyl or $C_{12}$alkyl,
$R_2$ is methyl,
$R_3$ is —$CH_2$—S—$R^2$, and $R^2$ is $C_8$alkyl or $C_{12}$alkyl, and
$R_4$ is hydrogen.

The combinations of components (b) and (c) of formulae I and II exhibit a synergistic action upon the substrate to be stabilised, that is to say upon the emulsion rubber, the synthetic latex or the natural rubber latex and articles manufactured therefrom.

Alkyl having up to 20 carbon atoms denotes a branched or unbranched radical, for example methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl or eicosyl.

The compounds of the formula I in the composition according to the invention are known in the literature and their preparation is described, for example, in U.S. Pat. No. 4,857,572.

The styrenic diphenylamines of the formula II are known in the literature, disclosed for example in U.S. Pat. No. 6,383,992 and commercially available as Wingstay 29 (RTM) (Goodyear).

The compounds of formula I in combination with the compound of formula II, are excellently suitable for stabilising emulsion crude rubber, synthetic latex or natural rubber latex, especially also pale emulsion crude rubber, pale synthetic latex or pale natural rubber latex, against oxidative, thermal, dynamic and/or light-induced degradation.

Elastomers manufactured from emulsion crude rubbers according to one of the customary processes (vulcanisation, for example, with sulfur or peroxide) are to be understood as being macromolecular materials that at room temperature, after considerable deformation under low stress, are capable of returning rapidly to virtually their original shape. See also Hans-Georg Elias, An Introduction to Polymer Science, chapter 12, Elastomers, pages 388-393, 1997, VCH Verlagsgesellschaft mbH, Weinheim, Germany; or Ullmann's Encyclopedia of Industrial Chemistry, Fifth, Completely Revised Edition, Volume A 23, pages 221-440 (1993).

The compositions according to the invention may comprise as emulsion crude rubbers, for example, the following materials:
1. Polymers of diolefins, for example polybutadiene or polyisoprene.
2. Copolymers of mono- and di-olefins with one another or with other vinyl monomers, for example propylene-isobutylene copolymers, propylene-butadiene copolymers, isobutylene-isoprene copolymers, ethylene-alkyl acrylate copolymers, ethylene-alkyl methacrylate copolymers, ethylene-vinyl acetate copolymers, acrylonitrile/butadiene copolymers and terpolymers of ethylene with propylene and a diene, such as hexadiene, dicyclopentadiene or ethylidenenorbornene.
3. Copolymers of styrene or α-methylstyrene with dienes or with acrylic derivatives, for example styrene-butadiene, styrene-butadiene-alkyl acrylate and methacrylate; and block copolymers of styrene, for example styrene-butadiene-styrene or styrene-isoprene-styrene.
4. Halogen-containing polymers, for example polychloroprene, chlorinated rubber, chlorinated and brominated copolymer of isobutylene-isoprene (halobutyl rubber).
5. Natural rubber.
6. Aqueous emulsions of natural or synthetic rubbers, for example natural rubber latex or latices of carboxylated styrene-butadiene copolymers.

The emulsion crude rubbers to be protected are preferably polydiene emulsion crude rubbers or halogen-containing polydiene emulsion crude rubbers, especially styrene-butadiene copolymer emulsion crude rubbers.

The compositions according to the invention may comprise as latices, for example, the following materials:
1. Copolymers of mono- and di-olefins with other vinyl monomers, for example ethylene-alkyl acrylate copolymers, ethylene-alkyl methacrylate copolymers, ethylene-vinyl acetate copolymers and acrylonitrile/butadiene copolymers.
2. Copolymers of styrene or α-methylstyrene with dienes or with acrylic derivatives, for example styrene-butadiene, styrene-butadiene-alkyl acrylate and methacrylate.
3. Natural rubber.
4. Aqueous emulsions of natural or synthetic rubbers, for example natural rubber latex, latices of styrene-butadiene or of carboxylated styrene-butadiene copolymers.

The latex to be protected is preferably a carboxylated styrene-butadiene, a styrene-acrylic acid, a vinyl acetate-acrylate or a carboxylated butadiene-acrylonitrile. Of particular interest is a carboxylated styrene-butadiene latex (X-SBR).

Of interest is emulsion crude rubber, which has been coagulated with a halogen containing system. Halogen containing coagulation systems comprise alkaline and alkaline-earth metal salts of halogens, for example sodium chloride and calcium chloride.

Of very special interest is an emulsion styrene-butadiene rubber (ESBR) or nitrile butadiene rubber (NBR).

Component (b) of formula I is added to the emulsion crude rubber, synthetic latex or natural rubber latex to be stabilised advantageously in an amount of from 0.01 to 10%, for example from 0.02 to 5%, preferably from 0.05 to 1.0%, based on the dry solids content of the emulsion crude rubber, synthetic latex or natural rubber latex to be stabilised.

Component (c) of formula II is added, in combination with component (b) of formula I, to the emulsion crude rubber, synthetic latex or natural rubber latex to be stabilised advantageously each in an amount of from 0.01 to 10%, for example from 0.02 to 5%, preferably from 0.05 to 1.0%, based on the dry solids content of the emulsion crude rubber, synthetic latex or natural rubber latex to be stabilised.

In addition to components (a), (b) and (c), the compositions according to the invention may comprise further additives, for example the following additives:
1. Antioxidants
1.1. Alkylated monophenols, for example 2,6-di-tert-butyl-4-methylphenol, 2-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methyl phenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols that are linear or branched in the side chain, for example 2,6-dinonyl-4-methylphenol, 2,4-dimethyl-6-(1'-methylundec-1'-yl)-phenol, 2,4-dimethyl-6-(1'-methylheptadec-1'-yl)-phenol, 2,4-dimethyl-6-(1'-methyltridec-1'-yl)-phenol and mixtures thereof.

1.2. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl)adipate.

1.3. Tocopherols, for example α-tocopherol, β-tocopherol, γ-tocopherol, δ-tocopherol and mixtures thereof (Vitamin E).

1.4. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl)disulfide.

1.5. Alkylidene bisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclo-hexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl)butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4-methylphenyl]terephthalate, 1,1-bis(3,5-dimethyl-2-hydroxyphenyl)butane, 2,2-bis(3,5-di-tert-butyl-4-hydroxyphenyl)propane, 2,2-bis(5-tert-butyl-4-hydroxy-2-methylphenyl)-4-n-dodecylmercaptobutane, 1,1,5,5-tetra(5-tert-butyl-4-hydroxy-2-methylphenyl)pentane.

1.6. O-, N- and S-benzyl compounds, for example 3,5,3',5'-tetra-tert-butyl-4,4'-dihydroxydibenzyl ether, octadecyl-4-hydroxy-3,5-dimethylbenzyl mercaptoacetate, tridecyl-4-hydroxy-3,5-di-tert-butylbenzyl mercaptoacetate, tris(3,5-di-tert-butyl-4-hydroxybenzyl)-amine, bis(4-tert-butyl-3-hydroxy-2,6-dimethylbenzyl)dithioterephthalate, bis(3,5-di-tert-butyl-4-hydroxybenzyl) sulfide, isooctyl-3,5-di-tert-butyl-4-hydroxybenzyl mercaptoacetate.

1.7. Hydroxybenzylated malonates, for example dioctadecyl 2,2-bis(3,5-di-tert-butyl-2-hydroxybenzyl)malonate, dioctadecyl 2-(3-tert-butyl-4-hydroxy-5-methylbenzyl) malonate, di-dodecylmercaptoethyl 2,2-bis(3,5-di-tert-butyl-4-hydroxybenzyl)malonate, di[4-(1,1,3,3-tetramethylbutyl)phenyl] 2,2-bis(3,5-di-tert-butyl-4-hydroxybenzyl)malonate.

1.8. Hydroxybenzyl aromatic compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.9. Triazine compounds, for example 2,4-bisoctylmercapto-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl) isocyanurate, 1,3,5-tris(4-tert-butyl-3-hydroxy-2,6-dimethylbenzyl) isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)hexahydro-1,3,5-triazine, 1,3,5-tris(3,5-dicyclohexyl-4-hydroxybenzyl)isocyanurate.

1.10. Benzyl phosphonates, for example dimethyl 2,5-di-tert-butyl-4-hydroxybenzylphosphonate, diethyl 3,5-di-tert-butyl-4-hydroxybenzylphosphonate, dioctadecyl 3,5-di-tert-butyl-4-hydroxybenzylphosphonate, dioctadecyl 5-tert-butyl-4-hydroxy-3-methylbenzylphosphonate, calcium salt of 3,5-di-tert-butyl-4-hydroxybenzylphosphonic acid monoethyl ester.

1.11. Acylaminophenols, for example 4-hydroxylauric acid anilide, 4-hydroxystearic acid anilide, N-(3,5-di-tert-butyl-4-hydroxyphenyl)carbamic acid octyl ester.

1.12. Esters of β-(3,5-di-tert-butyl-4-hydroxyphenyl)propionic acid with mono- or poly-hydric alcohols, for example with methanol, ethanol, n-octanol, iso-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxalic acid diamide, 3-thiaundecanol, 3-thiapentadecanol, trimethylhexanediol, trimethylolpropane, 4-hydroxymethyl-1-phospha-2,6,7-trioxabicyclo[2.2.2] octane.

1.13. Esters of β-(3,5-dicyclohexyl-4-hydroxyphenyl)propionic acid with mono- or poly-hydric alcohols, for example with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis-(hydroxyethyl)oxalic acid diamide, 3-thiaundecanol, 3-thiapentadecanol, trimethylhexanediol, trimethylolpropane, 4-hydroxymethyl-1-phospha-2,6,7-trioxabicyclo-[2.2.2]octane.

1.14. Esters of 3,5-di-tert-butyl-4-hydroxyphenylacetic acid with mono- or poly-hydric alcohols, for example with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxalic acid diamide, 3-thiaundecanol, 3-thiapentadecanol, trimethylhexanediol, trimethylolpropane, 4-hydroxymethyl-1-phospha-2,6,7-trioxabicyclo-[2.2.2]octane.

1.15. Amides of β-(3,5-di-tert-butyl-4-hydroxyphenyl)propionic acid, for example N,N'-bis(3,5-di-tert-butyl-4-hydroxyphenylpropionyl)hexamethylenediamide, N,N'-bis(3,5-di-tert-butyl-4-hydroxyphenylpropionyl) trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]-propionyloxy)ethyl] oxamide (Naugard®XL-1 (Uniroyal)).

1.16. Ascorbic acid (Vitamin C).

1.17. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-di(2-naphthyl)-p-phenylenediamine, N-isopropyl-N'-phenyl-p-phenylenediamine, N-(1,3-dimethyl-butyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfonamido)-diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylamino-phenol, 4-dodecanoylaminophenol, 4-octadecanoylaminophenol, di(4-methoxyphenyl)-amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-di[(2-methylphenyl)amino]ethane, 1,2-di(phenylamino)propane, (o-tolyl)-biguanide, di[4-(1',3'-dimethylbutyl)-phenyl]amine, tert-octylated N-phenyl-1-naphthylamine, mixture of mono- and di-alkylated tert-butyl-/tert-octyl-diphenylamines, mixture of mono- and di-alkylated nonyldiphenylamines, mixture of mono- and di-alkylated dodecyldiphenylamines, mixture of mono- and di-alkylated isopropyl-/isohexyl-diphenylamines, mixtures of mono- and di-alkylated tert-butyldiphenylamines, 2,3-dihydro-3,3-dimethyl-4H-1,4-benzothiazine, phenothiazine, mixture of mono- and di-alkylated tert-butyl-/tert-octyl-phenothiazines, mixture of mono- and di-alkylated tert-octylphenothiazines, N-allylphenothiazine, N,N,N',N'-tetraphenyl-1,4-diaminobut-2-ene.

2. UV absorbers and light stabilisers 2.1. 2-(2'-Hydroxyphenyl)benzotriazoles, for example 2-(2'-hydroxy-5'-methylphenyl)-benzo-triazole, 2-(3',5'-di-tert-butyl-2'-hydroxyphenyl)benzotriazole, 2-(5'-tert-butyl-2'-hydroxyphenyl)benzo-triazole, 2-(2'-hydroxy-5'-(1,1,3,3-tetramethylbutyl)phenyl)benzo-triazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzo-triazole, 2-(2'-hydroxy-4'-octyloxyphenyl)benzotriazole, 2-(3',5'-di-tert-amyl-2'-hydroxyphenyl)benzotriazole, 2-(3',5'-bis(α,α-dimethylbenzyl)-2'-hydroxyphenyl)benzo-triazole, 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzo-triazole, 2-(3'-tert-butyl-2'-hydroxy-5'-(2-isooctyloxycarbonylethyl) phenylbenzotriazole, 2,2'-methylene-bis[4-(1,1,3,3-tetramethylbutyl)-6-benzotriazol-2-yl-phenol]; transesterification product of 2-[3'-tert-butyl-5'-(2-methoxycarbonylethyl)-2'-hydroxyphenyl]-benzotriazole with polyethylene glycol 300;

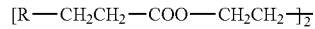

in which R=3'-tert-butyl-4'-hydroxy-5'-2H-benzotriazol-2-yl-phenyl; 2-[2'-hydroxy-3'-(α,α-dimethylbenzyl)-5'-(1,1,3,3-tetramethylbutyl)phenyl]-benzotriazole; 2-[2'-hydroxy-3'-(1,1,3,3-tetramethylbutyl)-5'-(α,α-dimethylbenzyl)phenyl]-benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy, 2'-hydroxy-4,4'-dimethoxy derivative.

2.3. Esters of unsubstituted or substituted benzoic acids, for example 4-tert-butylphenyl salicylate, phenyl salicylate, octylphenyl salicylate, dibenzoylresorcinol, bis(4-tert-butylbenzoyl)-resorcinol, benzoylresorcinol, 3,5-di-tert-butyl-4-hydroxybenzoic acid 2,4-di-tert-butylphenyl ester, 3,5-di-tert-butyl-4-hydroxybenzoic acid hexadecyl ester, 3,5-di-tert-butyl-4-hydroxybenzoic acid octadecyl ester, 3,5-di-tert-butyl-4-hydroxybenzoic acid 2-methyl-4,6-di-tert-butylphenyl ester.

2.4. Acrylates, for example α-cyano-β,β-diphenylacrylic acid ethyl ester or isooctyl ester, α-methoxycarbonylcinnamic acid methyl ester, α-cyano-β-methyl-p-methoxycinnamic acid methyl ester or butyl ester, α-methoxycarbonyl-p-methoxycinnamic acid methyl ester, N-(β-methoxycarbonyl-β-cyanovinyl)-2-methylindoline.

2.5. Nickel compounds, for example nickel complexes of 2,2'-thio-bis[4-(1,1,3,3-tetramethylbutyl)phenol], such as the 1:1 or 1:2 complex, optionally with additional ligands, such as n-butylamine, triethanolamine or N-cyclohexyldiethanolamine, nickel dibutyl dithio-carbamate, nickel salts of 4-hydroxy-3,5-di-tert-butylbenzylphosphonic acid monoalkyl esters, such as of the methyl or ethyl ester, nickel complexes of ketoximes, such as of 2-hydroxy-4-methylphenylundecyl ketoxime, nickel complexes of 1-phenyl-4-lauroyl-5-hydroxypyrazole, optionally with additional ligands.

2.6. Sterically hindered amines, for example bis(2,2,6,6-tetramethylpiperidin-4-yl)sebacate, bis(2,2,6,6-tetramethylpiperidin-4-yl)succinate, bis(1,2,2,6,6-pentamethylpiperidin-4-yl)sebacate, bis(1-octyloxy-2,2,6,6-tetramethylpiperidin-4-yl)sebacate, n-butyl-3,5-di-tert-butyl-4-hydroxybenzylmalonic acid bis(1,2,2,6,6-pentamethylpiperidyl) ester, condensation product of 1-hydroxyethyl-2,2,6,6-tetramethyl-4-hydroxypiperidine and succinic acid, linear or cyclic condensation products of N,N'-bis(2,2,6,6-tetramethyl-4-piperidyl)hexamethylenediamine and 4-tert-octylamino-2,6-dichloro-1,3,5-s-triazine, tris(2,2,6,6-tetramethyl-4-piperidyl) nitrilotriacetate, tetrakis(2,2,6,6-tetramethyl-4-piperidyl) 1,2,3,4-butanetetraoate, 1,1'-(1,2-ethanediyl)bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro-[4.5]decane-2,4-dione, bis(1-octyloxy-2,2,6,6-tetramethylpiperidyl)sebacate, bis(1-octyloxy-2,2,6,6-tetramethylpiperidyl)succinate, linear or cyclic condensation products of N,N'-bis-(2,2,6,6-tetramethyl-4-piperidyl)hexamethylenediamine and 4-morpholino-2,6-dichloro-1,3,5-triazine, condensation product of 2-chloro- 4,6-di(4-n-butylamino-2,2,6,6-tetramethylpiperidyl)-1,3, 5-triazine and 1,2-bis(3-aminopropylamino)ethane, condensation product of 2-chloro-4,6-di(4-n-butylamino-1,2,2,6,6-pentamethylpiperidyl)-1,3,5-triazine and 1,2-bis (3-aminopropylamino)ethane, 8-acetyl-3-dodecyl-7,7,9, 9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)-pyrrolidine-2,5-dione, mixture of 4-hexadecyloxy- and 4-stearyloxy-2,2,6,6-tetramethylpiperidine, condensation product of N,N'-bis(2,2,6,6-tetramethyl-4-piperidyl)hexamethylenediamine and 4-cyclohexylamino-2,6-dichloro-1,3,5-triazine, condensation product of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); condensation product of 1,6-diaminohexane and 2,4,6-trichloro-1,3,5-triazine as well as N,N-dibutylamine and 4-butylamino-2,2,6,6-tetramethylpiperidine (CAS Reg. No. [192268-64-7]; N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxo-spiro[4.5]decane, reaction product of 7,7,9,9-tetramethyl-2-cyclo-undecyl-1-oxa-3, 8-diaza-4-oxospiro[4.5]decane and epichlorohydrin, 1,1-bis(1,2,2,6,6-pentamethyl-4-piperidyloxycarbonyl)-2-(4-methoxyphenyl) ethene, N,N'-bis-formyl-N,N'-bis(2,2,6, 6-tetramethyl-4-piperidyl)hexamethylenediamine, diester of 4-methoxymethylene-malonic acid with 1,2,2,6,6-pentamethyl-4-hydroxypiperidine, poly[methylpropyl-3-oxy-4-(2,2,6,6-tetramethyl-4-piperidyl)]siloxane, reaction product of maleic acid anhydride α-olefin copolymer and 2,2,6,6-tetramethyl-4-aminopiperidine or 1,2,2,6,6-pentamethyl-4-aminopiperidine.

2.7. Oxalic acid diamides, for example 4,4'-dioctyloxy oxanilide, 2,2'-diethoxy oxanilide, 2,2'-dioctyloxy-5,5'-di-tert-butyl oxanilide, 2,2'-didodecyloxy-5,5'-di-tert-butyl oxanilide, 2-ethoxy-2'-ethyl oxanilide, N,N'-bis(3-dimethylaminopropyl) oxalamide, 2-ethoxy-5-tert-butyl-2'-ethyl oxanilide and a mixture thereof with 2-ethoxy-2'-ethyl-5,4'-di-tert-butyl oxanilide, mixtures of o- and p-methoxy- and also of o- and p-ethoxy-di-substituted oxanilides.

2.8. 2-(2-Hydroxyphenyl)-1,3,5-triazines, for example 2,4, 6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropyloxy)phenyl]-4,6-bis(2,4-dimethylphenyl)-1,3,5-triazine, 2-[2-hydroxy-4-(2-hydroxy-3-octyloxypropyloxy)phenyl]-4,6-bis(2,4-dimethylphenyl)-1,3,5-triazine, 2-[4-(dodecyloxy-/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)-phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy) phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine.

3. Metal deactivators, for example N,N'-diphenyloxalic acid diamide, N-salicylal-N'-salicyloyl-hydrazine, N,N'-bis (salicyloyl)hydrazine, N,N'-bis(3,5-di-tert-butyl-4-hydroxyphenylpropionyl)hydrazine, 3-salicyloylamino-1,2, 4-triazole, bis(benzylidene)oxalic acid dihydrazide, oxanilide, isophthalic acid dihydrazide, sebacic acid bisphenylhydrazide, N,N'-diacetyladipic acid dihydrazide, N,N'-bis-salicyloyloxalic acid dihydrazide, N,N'-bis-salicyloylthiopropionic acid dihydrazide.

4. Phosphites and phosphonites, for example triphenyl phosphite, diphenyl alkyl phosphites, phenyl dialkyl phosphites, tris(nonylphenyl)phosphite, trilauryl phosphite, trioctadecyl phosphite, distearylpentaerythritol diphosphite, tris(2,4-di-tert-butylphenyl)phosphite, diisodecyl-pentaerythritol diphosphite, bis(2,4-di-tert-butylphenyl)pentaerythritol diphosphite, bis(2,4-di-cumylphenyl)pentaerythritol diphosphite, bis(2,6-di-tert-butyl-4-methylphenyl)-pentaerythritol diphosphite, bis-isodecyloxypentaerythritol diphosphite, bis(2,4-di-tert-butyl-6-methylphenyl)pentaerythritol diphosphite, bis(2, 4,6-tri-tert-butylphenyl)pentaerythritol diphosphite, tristearylsorbitol triphosphite, tetrakis(2,4-di-tert-butylphenyl)-4,4'-biphenylene diphosphonite, 6-isooctyloxy-2, 4,8,10-tetra-tert-butyl-12H-dibenz[d,g]-1,3,2-dioxaphosphocine, bis(2,4-di-tert-butyl-6-methylphenyl) methylphosphite, bis(2,4-di-tert-butyl-6-methylphenyl) ethylphosphite, 6-fluoro-2,4,8,10-tetra-tert-butyl-12-methyl-dibenz[d,g]-1,3,2-dioxaphosphocine, 2,2',2"-nitrilo[triethyl-tris(3,3',5,5'-tetra-tert-butyl-1,1'-biphenyl-2,2'-diyl)-phosphite], 2-ethylhexyl-(3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane.

5. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine from hydrogenated tallow fatty amines.

6. Nitrones, for example N-benzyl-alpha-phenylnitrone, N-ethyl-alpha-methylnitrone, N-octyl-alpha-heptylnitrone, N-lauryl-alpha-undecylnitrone, N-tetradecyl-alpha-tridecylnitrone, N-hexadecyl-alpha-pentadecylnitrone, N-octadecyl-alpha-heptadecylnitrone, N-hexadecyl-alpha-heptadecylnitrone, N-octadecyl-alpha-pentadecylnitrone, N-heptadecyl-alpha-heptadecylnitrone, N-octadecyl-alpha-hexadecylnitrone, nitrones derived from N,N-dialkylhydroxylamines prepared from hydrogenated tallow fatty amines.

7. Thiosynergistic compounds, for example thiodipropionic acid dilauryl ester or thiodipropionic acid distearyl ester or compounds of formula I'

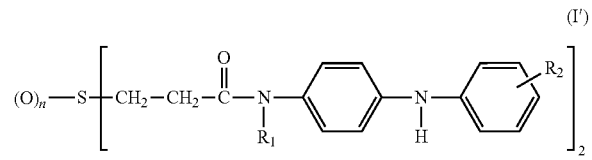

(I')

wherein

R₁ is hydrogen, $C_1$-$C_{12}$alkyl, cyclohexyl, phenyl or benzyl,

R₂ is hydrogen or $C_1$-$C_4$alkyl, and n is the number 0, 1 or 2.

8. Peroxide-destroying compounds, for example esters of β-thio-dipropionic acid, for example the lauryl, stearyl, myristyl or tridecyl ester, mercaptobenzimidazole, the zinc salt of 2-mercaptobenzimidazole, zinc dibutyldithiocarbamate, dioctadecyldisulfide, pentaerythritol tetrakis (β-dodecylmercapto)propionate.

9. Basic co-stabilisers, for example melamine, polyvinylpyrrolidone, dicyanodiamide, triallyl cyanurate, urea derivatives, hydrazine derivatives, amines, polyamides, polyurethanes, alkali metal and alkaline earth metal salts of higher fatty acids, for example calcium stearate, zinc stearate, magnesium behenate, magnesium stearate, sodium ricinoleate, potassium palmitate, antimony pyrocatecholate or zinc pyrocatecholate.

10. Nucleating agents, for example inorganic substances, for example talc, metal oxides, such as titanium dioxide or magnesium oxide, phosphates, carbonates or sulfates of preferably alkaline earth metals; organic compounds, such as mono- or poly-carboxylic acids and their salts, for example 4-tert-butylbenzoic acid, adipic acid, diphenylacetic acid, sodium succinate or sodium benzoate; polymeric compounds, for example ionic copolymerisates ("ionomers"). Special preference is given to 1,3:2,4-bis (3',4'-dimethylbenzylidene)sorbitol, 1,3:2,4-di(paramethyldibenzylidene)sorbitol and 1,3:2,4-di(benzylidene)sorbitol.

11. Fillers and reinforcing agents, for example calcium carbonate, silicates, glass fibres, glass beads, talc, kaolin, mica, barium sulfate, metal oxides and hydroxides, carbon black, graphite, wood powders, and powders or fibres of other natural products, synthetic fibres.

12. Other additives, for example plasticisers, lubricants, emulsifiers, pigments, rheology additives, catalysts, flow auxiliaries, optical brighteners, flame retardants, antistatics, blowing agents.

13. Benzofuranones and indolinones (lactones), for example those disclosed in U.S. Pat. Nos. 4,325,863; 4,338,244; 5,175,312; 5,216,052; 5,252,643; DE-A-4316611; DE-A-4316622; DE-A-4316876; EP-A-0589839, EP-A-0591102; EP-A-1291384 or 3-[4-(2-acetoxyethoxy)phenyl]-5,7-di-tert-butylbenzofuran-2-one, 5,7-di-tert-butyl-3-[4-(2-stearoyl-oxyethoxy)phenyl]benzofuran-2-one, 3,3'-bis[5,7-di-tert-butyl-3-(4-[2-hydroxyethoxy]phenyl)-benzofuran-2-one], 5,7-di-tert-butyl-3-(4-methoxyphenyl)benzofuran-2-one, 7-di-tert-butyl-3-(4-ethoxyphenyl)benzofuran-2-one, 3-(4-acetoxy-3,5-dimethylphenyl)-5,7-di-tert-butylbenzofuran-2-one, 3-(3,5-dimethyl-4-pivaloyloxyphenyl)-5,7-di-tert-butylbenzofuran-2-one, 3-(3,4-dimethylphenyl)-5,7-di-tert-butylbenzofuran-2-one, 3-(2,3-dimethylphenyl)-5,7-di-tert-butylbenzofuran-2-one, 3-(2-acetyl-5-isooctylphenyl)-5-isooctylbenzofuran-2-one.

Especially preferred benzofuran-2-one stabilisers (lactones) are for example 5,7-di-tert-butyl-3-phenyl-benzofuran-2-one; 5,7-di-tert-butyl-3-(3,4-dimethylphenyl)-benzofuran-2-one; 5,7-di-tert-butyl-3-(2,3-dimethylphenyl)-benzofuran-2-one, 5,7-di-tert-butyl-3-(4-methoxyphenyl)-benzofuran-2-one, 5-tert-octyl-3-(2-acetyl-5-tert-octylphenyl)-benzofuran-2-one or a compound of the formula B-1 or B-2 or mixtures thereof.

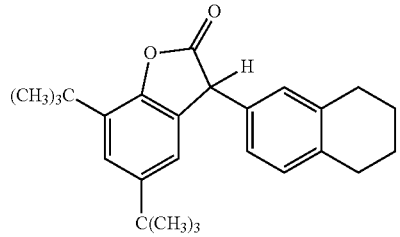

(B-1)

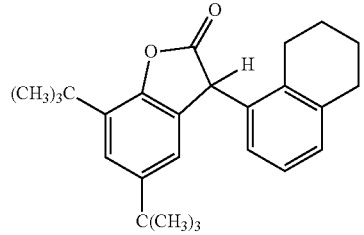

(B-2)

The benzofuran-2-one stabilizers (lactones) are known in the literature and disclosed for example in U.S. Pat. No. 5,516,920.

Preferred compositions according to the invention comprise as further additives additionally one or more components from the group of pigments, dyes, fillers, flow auxiliaries, dispersants, plasticisers, vulcanisation activators, vulcanisation accelerators, vulcanisation agents, charge control agents, adhesion promoters, light stabilisers or antioxidants, for example phenolic antioxidants (points 1.1 to 1.15 of the above list) or aminic antioxidants (point 1.17 of the list), organic phosphites or phosphonites (point 4 of the list), lactones and/or thiosynergistic compounds (point 7 of the list).

The additional additives are added, for example, in concentrations of from 0.01 to 10%, based on the dry solids content of the emulsion crude rubber, synthetic latex or natural rubber latex to be stabilised.

The incorporation of components (b) and (c) and optionally further additives into the emulsion crude rubber, synthetic latex or natural rubber latex is carried out according to known methods, preferably after polymerisation or during the preparation of the mixture or before or during shaping, optionally with subsequent removal of a solvent by evaporation. Components (b) and (c) and optionally further additives may also be added to the emulsion crude rubber to be stabilised in the form of a master batch comprising those components, for example, in a concentration of from 2.5 to 25% by weight each.

Components (b) and (c) and optionally further additives are especially preferably added before or during the polymerisation of synthetic emulsion crude rubbers or after the polymerisation to rubber latex has been stopped.

Components (b) and (c) and optionally further additives may be added before or during the polymerisation of latices or before crosslinking.

Components (b) and (c) and optionally further additives may be incorporated into the emulsion crude rubber, synthetic latex or natural rubber latex to be stabilised in pure form or encapsulated in waxes, oils or polymers.

The resulting stabilised emulsion crude rubbers can be used further in a wide variety of forms, for example in the form of strips, moulding materials, profiles, conveyor belts or tyres, by mixing them with the customary formulation constituents according to one of the usual processes and vulcanising them (for example with sulfur or peroxide).

The resulting stabilised latices can be used further in a wide variety of forms, for example in the form of films, strips, moulding materials, in the paper industry, for example, in paper coatings; in the adhesives industry, for example, in dispersion adhesives; in the dyestuffs industry for disperse dyes and also in the textiles industry and, in the latter case, specifically in the field of carpeting, by mixing the latices with the customary formulation constituents according to one of the usual processes, applying them, for example, to the reverse side of a carpet, and drying them.

The present invention relates also to a method of stabilising an emulsion crude rubber, synthetic latex or natural rubber latex subject to oxidative, thermal, dynamic and/or light-induced degradation, in which method at least a component (b) and a component (c) is mixed with that material or applied thereto.

A further embodiment of the present invention is the use of components (b) and (c) for stabilising an emulsion crude rubber, synthetic latex or natural rubber latex subject to oxidative, thermal, dynamic and/or light-induced degradation.

The preferred components (b) and (c) for the uses and methods disclosed above are the same as those described for the compositions comprising an emulsion crude rubber, synthetic latex or natural rubber latex.

The following Examples illustrate the invention further. Percentages relate to weight, unless otherwise indicated.

EXAMPLE 1

Stabilisation of Emulsion Crude Rubber

Commercially produced hot NBR latex has been used for testing. The additive systems were incorporated into the latex in form of emulsions. The rubber was then coagulated using the following procedure:

1400 g of stabiliser containing NBR latex has been added slowly under stirring to 2800 g of coagulation serum, which is composed of 2786 g of demineralised water and 14 g of calcium chloride. Coagulation temperature was 50° C. The rubber crumbs received after coagulation were washed in demineralised neutral water at 65° C. The wet crumbs were dewatered by passing them through a rubber covered roll mill and then dried over night at 50° C. in a vacuum oven. The wet rubber was compression molded to 10 mm sheets and these sheets were oven aged at 80° C. The color was assessed once a week visually by means of a color scale ranging from 0 (colorless) to 10 (deep brown). The results are summarized in Table 1.

TABLE 1

| | | Color after weeks aging at 80° C. | | | |
|---|---|---|---|---|---|
| Example | Additive system | 0 | 2 | 4 | 6 |
| 1a | 0.20% Irganox 1520[a] 0.20% Wingstay 29[b] | 5 | 5.5 | 6 | 6.5 |

[a]Irganox 1520 (RTM) (Ciba Inc.) is 4,6-bis(octylthiomethyl)-o-cresol.
[b]Wingstay 29 (RTM) (Goodyear) is styrenated diphenylamine of the formula II.

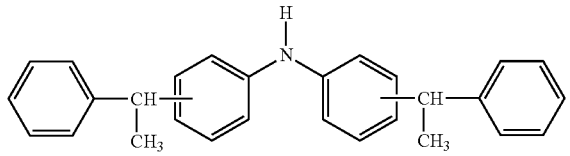

What is claimed is:
1. A composition comprising
(a) an emulsion crude rubber, synthetic latex or natural rubber latex subject to oxidative, thermal, dynamic and/or light-induced degradation, and
(b) a compound of the formula I

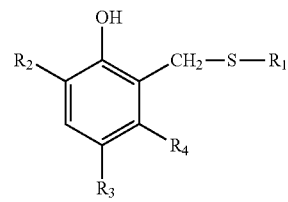

wherein
$R_1$ is $C_8$-$C_{12}$alkyl,
$R_2$ is hydrogen, $C_1$-$C_{12}$alkyl, cyclohexyl, 1-methylcyclohexyl, benzyl, α-methylbenzyl, α,α-dimethylbenzyl or —$CH_2$—S—$R_1$,
$R_3$ is $C_1$-$C_{12}$alkyl, benzyl, α-methylbenzyl, α,α,-dimethylbenzyl or —$CH_2$—S—$R_1$,
$R_4$ is hydrogen or methyl, and
(c) a styrenated diphenylamine of formula II

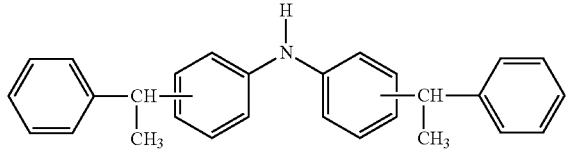

wherein (b) is present from 0.05 to 1.0% by weight and (c) is present from 0.05 to 0.2% by weight based on the weight of a dry solids content of (a).
2. A composition according to claim 1, wherein $R_1$ is $C_8$alkyl or $C_{12}$alkyl.
3. A composition according to claim 1, wherein
$R_1$ is $C_8$alkyl or $C_{12}$alkyl,
$R_2$ is methyl,
$R_3$ is —$CH_2$—S—$R_1$, and $R_1$ is $C_8$alkyl or $C_{12}$alkyl, and
$R_4$ is hydrogen.
4. A composition according to claim 1, wherein component (a) is a pale emulsion crude rubber, a pale synthetic latex or a pale natural rubber latex.
5. A composition according to claim 1, wherein component (a) is a polydiene emulsion crude rubber, a halogen-containing polydiene emulsion crude rubber or a styrene-butadiene copolymer emulsion crude rubber.

6. A composition according to claim 1, wherein component (a) is a carboxylated styrene-butadiene, a styrene-acrylic acid, a vinyl acetate-acrylate or a carboxylated butadiene-acrylonitrile.

7. A composition according to claim 1, wherein component (a) is an emulsion crude rubber which has been coagulated with a halogen containing system.

8. A composition according to claim 1, wherein component (a) is an emulsion styrene-butadiene rubber (ESBR) or nitrile butadiene rubber (NBR).

9. A composition according to claim 1, comprising in addition to components (a), (b) and (c) additionally further additives.

10. A composition according to claim 9, comprising as further additives pigments, dyes, fillers, flow auxiliaries, dispersants, plasticisers, charge control agents, adhesion promoters, further antioxidants and/or light stabilizers.

11. A composition according to claim 9, comprising as further additives phenolic antioxidants, aminic antioxidants, organic phosphites or phosphonites, lactones and/or thio-synergistic compounds.

12. The composition according to claim 1 wherein
wherein (b) is present in an amount of 0.20% by weight and (c) is present in an amount of 0.20% by weight based on the weight of a dry solids content of (a).

13. A method of stabilising at least one material selected from the group consisting of an emulsion crude rubber, synthetic latex or natural rubber latex subject to oxidative, thermal, dynamic and/or light-induced degradation, comprising mixing at least a component (b) and a component (c) with that material or applied thereto wherein (b) is a compound of the formula I

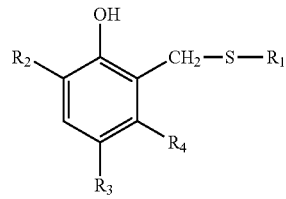

wherein
$R_1$ is $C_8$-$C_{12}$alkyl,
$R_2$ is hydrogen, $C_1$-$C_{12}$alkyl, cyclohexyl, 1-methylcyclohexyl, benzyl, α-methylbenzyl, α,α-dimethylbenzyl or —$CH_2$—S—$R_1$,
$R_3$ is $C_1$-$C_{12}$alkyl, benzyl, α-methylbenzyl, α,α,-dimethylbenzyl or —$CH_2$—S—$R_1$,
$R_4$ is hydrogen or methyl, and
(c) is a styrenated diphenylamine of formula II

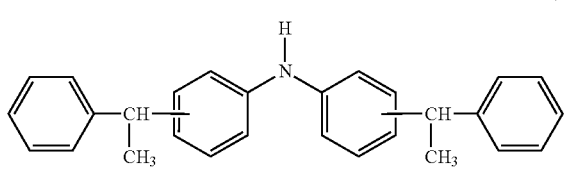

wherein (b) is present from 0.05 to 1.0% by weight and (c) is present from 0.05 to 0.2% by weight based on the weight of a dry solids content of (a).

* * * * *